United States Patent [19]

Cromer

[11] Patent Number: 5,125,796
[45] Date of Patent: Jun. 30, 1992

[54] TRANSITION PIECE SEAL SPRING FOR A GAS TURBINE

[75] Inventor: Robert H. Cromer, Gloversville, N.Y.

[73] Assignee: General Electric Company, Schenectady, N.Y.

[21] Appl. No.: 699,584

[22] Filed: May 14, 1991

[51] Int. Cl.⁵ .............................................. F01D 11/00
[52] U.S. Cl. ............................... 415/174.2; 415/170.1; 415/135; 277/97; 277/236; 277/206 A; 277/DIG. 9
[58] Field of Search .................... 277/236, 205, 206 A, 277/97, DIG. 9; 415/170.1, 174.2, 135, 180

[56] References Cited

U.S. PATENT DOCUMENTS

| | | | |
|---|---|---|---|
| 3,817,654 | 6/1974 | Sohma | 415/103 |
| 4,067,585 | 1/1978 | Rode | 277/236 |
| 4,303,249 | 12/1981 | Illy | 277/236 |
| 4,379,560 | 4/1983 | Bakken | 277/236 |
| 4,410,163 | 10/1983 | Scobie et al. | 277/236 |
| 4,465,284 | 8/1984 | Szema | 277/22 |
| 4,759,555 | 7/1988 | Halling | 277/200 |
| 4,850,521 | 7/1989 | Servant | 277/167 |
| 5,002,288 | 3/1991 | Morrison et al. | 277/27 |

*Primary Examiner*—Edward K. Look
*Assistant Examiner*—Michael S. Lee
*Attorney, Agent, or Firm*—Nixon & Vanderhye

[57] ABSTRACT

The transition piece seal spring includes a pair of integrally formed spring clips folded at one end to define a support slot, the spring clips being disposed in back-to-back relation one to the other. Each spring clip includes a pair of elongated, arcuately disposed spring segments spaced one from the other defining a slot for receiving the outwardly directed flange of the transition piece edge. A flat leaf spring is received in the support slot and mounts the spring clip to the first-stage turbine outer nozzle support ring such that the spring clips depend radially between the flanges of adjacent edges of the transition pieces. The spring clips enable radial, circumferential and axial vibratory movement of the adjacent transition pieces whereby motion is taken up in high cycle fatigue rather than wear.

22 Claims, 2 Drawing Sheets

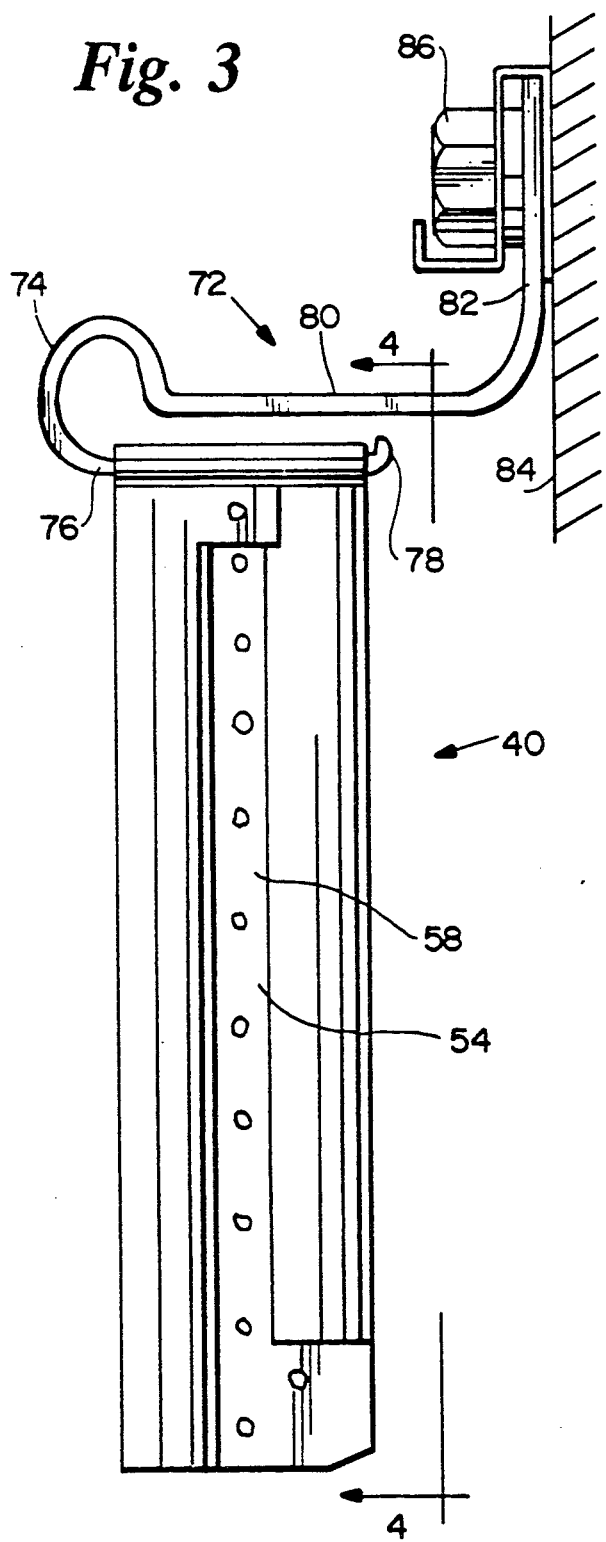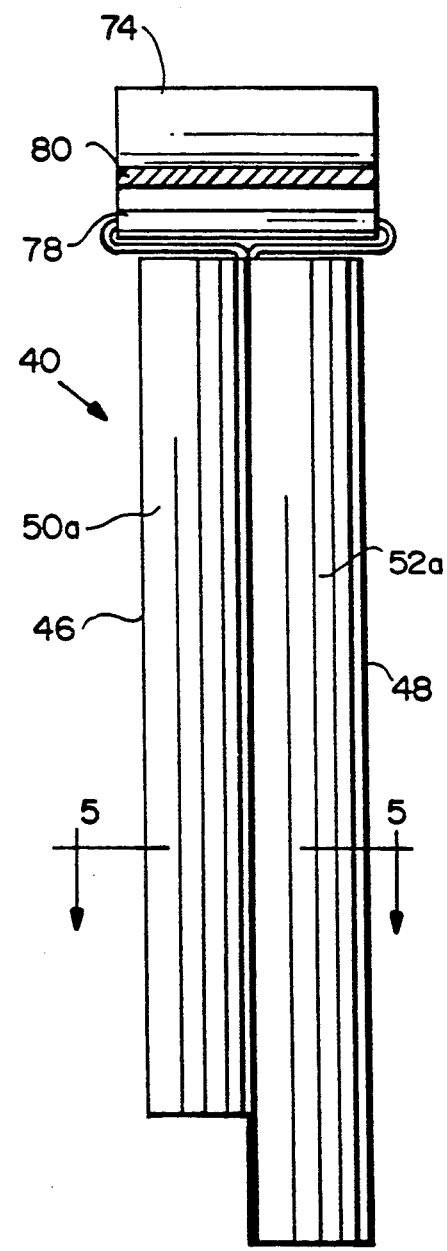

TRANSITION PIECE SEAL SPRING FOR A GAS TURBINE

BACKGROUND AND SUMMARY OF THE INVENTION

The present invention relates generally to turbines and particularly relates to a seal for sealing adjacent downstream edges of transition pieces which extend between combustors and the first-stage turbine inlet of a gas turbine.

In conventional gas turbines, a compressor supplies compressed air under relatively high pressure to a plurality of combustors where fuel is burned to produce a high-temperature energetic flow of gas to drive a turbine. The turbine, in turn, may drive the compressor and also turn an output shaft, for example, for the generation of electricity.

More particularly, the combustors comprise a plurality of generally cylindrical can-like housings having fuel nozzles and arranged in a spaced annular array. Transition pieces are similarly arranged in an annular array for directing the flow of hot combusted gases from the combustors to the first stage turbine inlet. These transition pieces have generally cylindrical upstream inlet openings for receiving the gases of combustion directly from the correspondingly shaped combustors and are configured over their lengths such that their downstream ends comprise arcuate segments opening into the turbine inlet. The aggregate of these downstream openings forms an annulus for flowing energetic gases to the first stage of the turbine. Consequently, the transition pieces direct the flow of energetic gases from spaced, generally cylindrical, discrete upstream configurations to arcuate segments forming a downstream annular configuration whereby a substantially annular flow of energetic gases is provided the first-stage turbine inlet.

The side edges of the arcuate segments of the transition pieces at their downstream ends are typically mechanically sealed one to the other to prevent loss of compressor air. For example, radial seals for this purpose are described and illustrated in U.S. Pat. No. 4,465,284, of common assignee herewith. However, seals of this type have demonstrated significant wear problems. The inherent weight of the seal disclosed in that patent has, to some extent, aggravated the wear problem by imposing greater impact forces on adjacent transition pieces due to vibration. While reducing the wear of the seals has been attempted, it has not been particularly successful.

The wear problem for the transition piece seal is in part caused by combustor noise which drives the sheet metal of the transition piece into vibratory modes in multiple directions. Rather than attempt to reduce the wear problem by substituting materials less prone to wear as previously attempted, the present invention provides a flexibility and resiliency to the seals to essentially absorb the vibratory motion in its multiple directions, i.e., axially, radially and circumferentially.

According to the present invention, there is provided a flexible resilient seal for engaging adjacent, substantially radially extending edges of the transition pieces at their downstream ends directly upstream of and adjacent to the first-stage inlet of the turbine. The seal comprises a pair of spring clips secured in back-to-back relation one to the other and adapted to receive respective edge portions, i.e., radially extending circumferentially or transversely directed flanges of the adjacent transition pieces. The vibratory movement of the adjacent transition pieces is thus absorbed by the spring clips, while substantially simultaneously the spring clips provide an effective seal between the adjacent edge portions of the transition pieces. More particularly, the spring clips each comprise a base portion having a pair of arcuate, generally elongated spring segments, spaced one from the other and extending from opposite edges of the base portion and to one side thereof. The segments of each pair extend radially and are axially spaced from one another for receiving the circumferentially directed and radially outwardly projecting flange of the associated transition piece. This flange engages the spring clip segments adjacent their free distal ends. The spring clip segments therefore permit vibratory movement of the transition piece in the axial, circumferential and radial directions, while maintaining the seal between the clip and the flange.

Preferably, the spring clips are formed from a single elongated sheet of metal which is folded substantially intermediate its length about a pair of foldlines back onto itself to define a central section and sections underlying the central section. The underlying sections are reversely folded such that the spring clips extend at right angles from the central and underlying sections. The spring clips are thus disposed in back-to-back relation one to the other. By folding the single sheet of material in this manner, the central section and the underlying sections define a slot which receives a leaf spring. This leaf spring mounts the seal to a turbine inlet nozzle support ring. The leaf spring is generally U-shaped, and has one leg inserted into the slot of the seal spring. The opposite leg has a turned end forming a flange for receiving a bolt whereby the leaf spring can be secured to the nozzle support ring. With the spring clips extending in a radial direction, the flanges of the transition pieces are received between the arcuate spring segments. Hence, the transition pieces are free to absorb vibratory movement in the axial, circumferential and radial directions of the turbine.

In a preferred embodiment according to the present invention, there is provided a seal for substantially sealing spaced edge portions of adjacent turbine transition pieces comprising a pair of spring clips adapted to receive respective edge portions of adjacent turbine transition pieces, the spring clips being joined one to the other and enabling relative vibratory movement of the adjacent edge portions of the transition pieces while simultaneously providing a substantial seal between the adjacent edge portions to substantially preclude leakage flow of air therebetween.

In a further preferred embodiment according to the present invention, there is provided a turbine having transition pieces for flowing gases from a plurality of circumferentially spaced combustors to a first-stage turbine inlet wherein the transition pieces are configured to shape the gas flows from the combustors from generally cylindrical configurations at their upstream ends to arcuate segments at their downstream ends, a seal for substantially sealing spaced edge portions of adjacent turbine transition pieces at their downstream ends including a pair of spring clips engaging respective downstream edge portions of adjacent turbine transition pieces, the spring clips being joined one to the other to enable relative vibratory movement of the adjacent edge portions of the adjacent transition pieces while simultaneously providing a substantial seal between the adjacent edge portions to substantially preclude leakage flow of air therebetween.

Accordingly, it is a primary object of the present invention to provide a novel and improved seal for transition pieces between the combustors and the first-stage turbine inlet in a gas turbine which greatly increases the wear life of the seal by affording compliance to the movement and vibration of the transition pieces. It is also an object of the present invention to provide a mounting spring which enables mounting of the transition piece seal to the first-stage nozzle support ring, allowing further movement and compliance of the transition piece seal, a flexible attachment to the turbine, and in case of spring seal failure, prevention of foreign object damage in the turbine.

These and further objects and advantages of the present invention will become more apparent upon reference to the following specification, appended claims and drawings.

BRIEF DESCRIPTION OF THE DRAWING FIGURES

FIG. 3 is an enlarged elevational view of a transition piece seal spring constructed in accordance with the present invention and looking in a direction transverse to the direction of flow through the turbine;

FIG. 4 is a cross-sectional view thereof taken generally about on line 4—4 in FIG. 3;

DETAILED DESCRIPTION OF THE DRAWING FIGURES

Reference will now be made in detail to a present preferred embodiment of the invention, an example of which is illustrated in the accompanying drawings.

Figure 1:
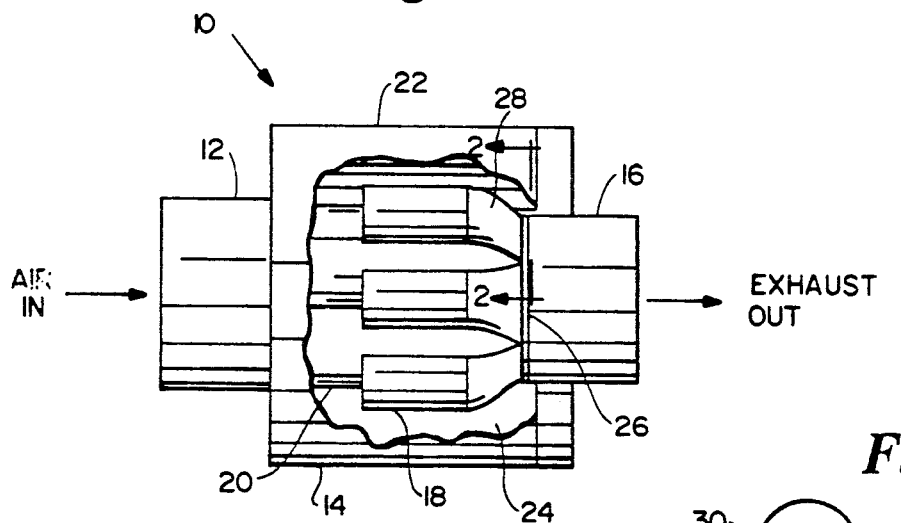
FIG. 1 is a schematic view of a gas turbine with portions broken out to illustrate certain internal structures of the turbine.

Referring now to the drawings, particularly to FIG. 1, there is illustrated a gas turbine, generally designated 10, having a compressor section 12 for compressing incoming air to a high pressurefor delivery to a combustion section 14. Fuel is burned with the compressed air in the combustor section 14 to produce a hot, energetic flow of products of combustion to a turbine section 16 where the hot, energetic gas flow rotates a turbine wheel. As well known, the turbine wheel may drive the compressor section 12, as well as an output shaft or produce thrust. Combustor section 14 includes a plurality of combustor cans 18, arranged in a circumferentially spaced annular array thereof about the axis of the combustor section 14. Each combustor can 18 receives fuel from a fuel supply line 20. Combustor section 14 is sealed by a wrapper 22 to form a substantially sealed plenum 24 for receiving compressed air from compressor section 12 and supplying it to the combustor cans 18 through apertures in the cans, not shown. It will be appreciated that the number of combustor cans illustrated in FIG. 1 is for representational purposes only and that in gas turbines, different numbers of combustor cans may be provided, for example, on the order of 12, 18 or more.

Figure 2:
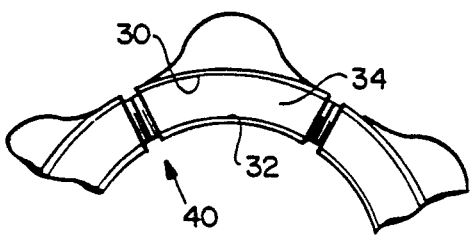
FIG. 2 is an enlarged cross-sectional view thereof taken generally about on line 2—2 in FIG. 1.

In order to conduct the hot gases from combustor cans 18 to the first-stage inlet 26 of the turbine 16 and to reconfigure the flow of the generally cylindrical outlets of the combustor cans 18 to an annular flow adjacent the first-stage turbine inlet, the energetic gases flowing from the combustor cans 18 pass through transition pieces 28. Transition pieces 28 comprise sheetmetal elements, generally circular in configuration at one end for sealing engagement with the outlet ends of the combustor cans 18. The transition pieces 28 have outlets at their downstream ends in the form of arcuate outer and inner edges 30 and 32, respectively, defining an arcuate annular segment 34. It will be appreciated from a review of FIG. 2 that the array of annular segments 34 at the downstream outlets of the transition pieces 28 form generally an annular outlet for flowing gas into the first-stage turbine inlet. Thus, the transition piece has intermediate portions which effectively change the shape of the piece from a circular configuration at its inlet upstream end to an annular arcuate segment at its outlet downstream end. Seals, not shown, are provided about the connection between the inlet ends of the transition pieces 28 and the outlet ends of the combustor cans 18. Similarly, seals are provided at the downstream ends of the transition pieces, particularly along the arcuate outer and inner panels 30 and 32 and between the segments 34, i.e., between the adjoining edges of the transition pieces at their downstream ends. These seals substantially seal the transition pieces from ingress of compressor air flow adjacent the juncture of the first-stage turbine inlet.

The transition piece seal springs of the present invention are provided to seal the adjoining edges of adjacent segments 34 at the downstream end of the transition pieces 28 to one another in a manner to substantially preclude flow of compressor air therethrough and enable resultant vibratory movement of the transition pieces relative to one another in a manner to minimize wear. The transition piece seal springs are generally designated 40.

Figure 5:
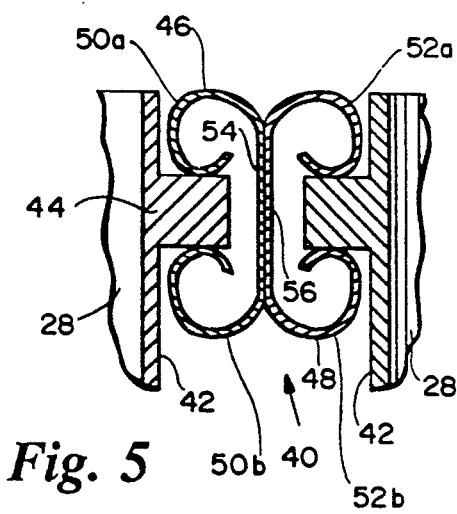
FIG. 5 is a cross-sectional view thereof taken generally about on line 5—5 in FIG. 4.

Referring particularly to FIG. 5, there is illustrated the adjacent edges 42 of adjacent transition pieces 28 at their downstream ends. These edges 42 are circumferentially spaced one from the other and have projecting flanges 44 extending toward the opposite adjacent edge 42. According to the present invention, seal spring 40 hereof seals the space between the flanges 44 while simultaneously structurally supporting the transition pieces in a manner to permit and absorb relative vibratory movement in radial, circumferential and axial directions, while inhibiting wear.

To accomplish this, each seal 40 includes a pair of spring clips 46 and 48 which lie in back-to-back relation one to the other. Spring clip 46 has a pair of spaced, elongated, arcuate spring clip segments 50a and 50b, while spring clip 48 similarly has spaced, elongated, arcuately extending spring clip segments 52a and 52b. Each clip 46 and 48 also includes a base portion 54 and 56, respectively. The spring clip segments of each spring clip thus extend arcuately from opposite edges of the corresponding base portion to one side thereof and in oppositely directed arcuate configurations toward one another of greater than 270° terminating in free ends thereof. For example, the arcuate segments 50a and 50b extend from the opposite edges of the base portion 54 and out of its plane to one side of base portion 54. Segments 50a and 50b then extend arcuately toward one another and define a slot 58 therebetween for receiving the flange 44 of a transition piece 28. Similarly, the spring clip 48 has arcuate segments 52a and 52b which extend from the opposite edges of base portion 56 out of its plane to one side of base portion 56. Segments 52a and 52b similarly extend arcuately toward one another and define a slot therebetween for receiving the flange of the adjacent transition piece 28.

Figure 6:
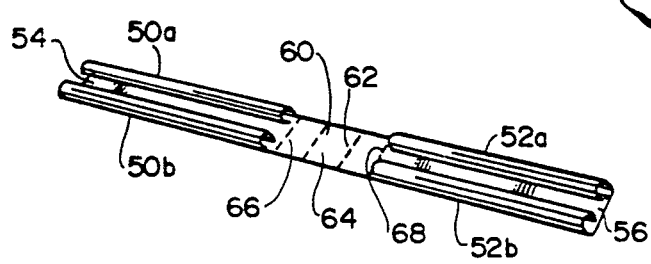
FIG. 6 is a perspective view of a transition piece seal spring illustrated in a flat condition prior to folding into its final configuration.
Figure 7:
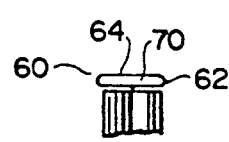
FIG. 7 is a fragmentary elevational view of the support section of the seal spring looking in the axial direction.

Referring to FIGS. 6 and 7, each transition piece seal spring is formed integrally from a single piece of sheet material. Thus, as illustrated in FIG. 6, a flat metal sheet has spring clip segments 50a, 50b, 52a and 52b formed and arcuately disposed to project outwardly of one side of the base portions 54 and 56 thereof. The base portions 54 and 56 are integrally connected one with the other by an intermediate section about which the base portions are folded such that they lie, in final assembly, in back-to-back relation one to the other. More particularly, a pair of transversely extending foldlines 60 and 62 define an upper support section 64 between foldlines 60 and 62. A pair of foldlines 66 and 68, outwardly of the foldlines 60 and 62, permit the base portions to be reversely folded to lie in back-to-back relation. More particularly, the intermediate section is folded about foldlines 60 and 62, as illustrated in FIG. 7, and base portions 54 and 56 are reversely folded about foldlines 66 and 68 such that base portion 54 and 56 lie in back-to-back relation one to the other as illustrated in FIG. 7. The base portions 54 and 56 are preferably welded back-to-back one to the other, for example, by spot welds 69 illustrated in FIG. 3. The panels between foldlines 60 and 66 and 62 and 68 form respective underlying support panels below upper support panel 64 and define therewith a slot 70 (FIG. 7) for receiving a support spring, which will now be described.

Referring now to FIGS. 3 and 4, the support spring is generally designated 72. Support spring 72 includes a flat leaf spring bent approximately 180° at one end 74 such that its free end 76 may be received in the slot 70 formed by the upper and lower support sections of the transition piece seal spring. A tab 78 is formed at the distal end of the spring end 76 to secure the support spring 72 and the spring clip one to the other. The opposite leg 80 of support spring 72 has a right-angle bend to define an end 82 for securing support spring 72 to a support 84. For example, a bolt 86 passes through an opening in the end 82 of the support spring 72 to secure the spring 72 to the first-stage outer nozzle turbine support ring 84. Both the spring clips and the support spring can be formed from sheetmetal stock, for example, Inconel X750.

Referring now to FIG. 4, one of the spring segments on each of the spring clips may be foreshortened at its distal end to facilitate installation of the spring clip in a manner to avoid interference by adjacent structure of the turbine. Thus, the spring may be canted for installation purposes at an angle prior to final installation in position receiving the flanges 44 of the transition pieces.

Thus, when the transition piece seal spring 40 is in position between the adjoining edges of the transition pieces 28, radial, circumferential and axial movement of the side edges of the adjoining transition pieces may be accommodated by the flexing and resilient action of the spring clips and support spring. The motion of the transition pieces is therefore taken up in high cycle fatigue, rather than in wear.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal for substantially sealing spaced edge portions of adjacent turbine transition pieces comprising:

of spring clips adapted to receive respective edge portions of adjacent turbine transition pieces;

said spring clips being joined one to the other and enabling relative vibratory movement of the adjacent edge portions of the transition pieces while simultaneously providing a substantial seal between the adjacent edge portions to substantially preclude leakage flow of air therebetween.

2. A seal according to claim 1 wherein each spring clip includes a pair of generally parallel spaced elongated spring segments having arcuate cross-sections for engaging an edge portion of the associated transition piece therebetween.

3. A seal according to claim 2 wherein each spring clip includes an elongated base portion extending between said pair of segments, said pair of segments lying on one side of said base portion whereby said arcuate spring segments define a slot therebetween on said one side of said base portion for receiving an edge portion of the transition piece.

4. A seal according to claim 3 wherein said spring clips are integral with one another and said spring segments extend from opposite elongated edges of said base portions along arcs extending oppositely relative to one another and for at least 270°.

5. A seal according to claim 4 wherein each segment of each spring clip is arcuately curved toward the other segment of said spring clip.

6. A seal according to claim 1 wherein each clip comprises a base portion and a pair of generally parallel spaced spring segments for engaging an edge portion of the adjacent transition piece therebetween, said spring clips being formed of a single piece of elongated sheet material folded intermediate its ends such that said base portions lie in back-to-back relation relative to one another and said pair of spring segments project from said base portions in respective opposite directions.

7. A seal according to claim 6 wherein the spring segments of each pair thereof are arcuate in cross-section and define a slot therebetween for engaging an edge portion of the adjacent transition piece.

8. A seal according to claim 7 wherein each said spring clip is elongated and said spring segments thereof extend from opposite sides of said base portion along arcs extending oppositely relative to one another and for at least 270°.

9. A seal according to claim 1 including a spring strip connected to said spring clips for mounting the spring clips to the turbine.

10. A seal according to claim 9 wherein each spring clip comprises a base portion and a pair of spaced spring segments for engaging an edge portion of the adjacent transition piece therebetween, said spring clips being formed of a single piece of elongated sheet material folded intermediate its ends such that said base portions lie in back-to-back relation relative to one another and said pair of spring segments project from said base portions in respective opposite directions, said single piece being folded along a pair of spaced foldlines intermediate the ends of said single piece to form a support section generally perpendicular to said base portions, said spring strip being connected to said support section.

11. A seal according to claim 10 wherein said single piece is reversely folded along a pair of foldlines between said support section and each said pair of spring segments, respectively, to form a pair of bottom support sections underlying the first-mentioned support section and defining a slot therewith, said spring strip being in part received in said slot for securing said spring strip and said single piece of sheet material one to the other.

12. In a turbine having transition pieces for flowing gases from a plurality of circumferentially spaced combustors to a first-stage turbine inlet wherein the transition pieces are configured to shape the gas flows from the combustors from generally cylindrical configurations at their upstream ends to arcuate segments at their downstream ends, a seal for substantially sealing spaced edge portions of adjacent turbine transition pieces at their downstream ends including:

a pair of spring clips engaging respective downstream edge portions of adjacent turbine transition pieces;
said spring clips being joined one to the other to enable relative vibratory movement of the adjacent edge portions of said adjacent transition pieces while simultaneously providing a substantial seal between said adjacent edge portions to substantially preclude leakage flow of air therebetween.

13. A turbine according to claim 12 wherein each spring clip includes a pair of generally parallel spaced elongated spring segments having arcuate cross-sections for engaging an edge portion of the associated transition piece therebetween.

14. A turbine according to claim 13 wherein each spring clip includes an elongated base portion extending between said pair of segments, said pair of segments being elongated and lying on one side of said base portion whereby said arcuate spring segments define an elongated slot therebetween on one side of said base portion for receiving said edge portion of said transition piece.

15. A turbine according to claim 14 wherein said spring clips are integral with one another and said spring segments extend from opposite elongated edges of said base portions along arcs extending oppositely relative to one another and for at least 270°.

16. A turbine according to claim 15 wherein each segment of each spring clip is arcuately curved toward the other segment of said spring clip.

17. A turbine according to claim 12 wherein each clip comprises a base portion and a pair of generally parallel spaced spring segments for engaging said edge portion of said adjacent transition piece therebetween, said spring clips being formed of a single piece of elongated sheet material folded intermediate its ends such that said base portions lie in back-to-back relation relative to one another and said pair of spring segments project from said base portions in respective opposite directions.

18. A turbine according to claim 17 wherein the spring segments of each pair thereof are arcuate in cross-section and define a slot therebetween for engaging an edge portion of the adjacent transition piece.

19. A turbine according to claim 18 wherein each said spring clip is elongated and said spring segments thereof extend from opposite sides of said base portion along arcs extending oppositely relative to one another and for at least 270°.

20. A turbine according to claim 12 including a spring strip connected to said spring clips for mounting the spring clips to said turbine.

21. A turbine according to claim 20 wherein each spring clip comprises a base portion and a pair of generally parallel, spaced, and elongated spring segments engaging an edge portion of the adjacent transition piece therebetween, said spring clips being formed of a single piece of elongated sheet material folded intermediate its ends such that said base portions lie in back-to-back relation relative to one another and said pairs of spring segments project from said base portions in respective opposite directions, said single piece being folded along a pair of spaced foldlines intermediate the ends thereof to form a support section generally perpendicular to said base portions, said spring strip being connected to said support section.

22. A turbine according to claim 21 wherein said single piece is reversely folded along a pair of foldlines between said support section and each said pair of spring segments, respectively, to form a pair of bottom support sections underlying the first-mentioned support section and defining a slot therewith, said spring strip being in part received in said slot for securing said spring strip and said single piece of sheet material one to the other.

* * * * *